May 19, 1931.  C. G. FAWKES  1,805,574
VEHICLE WHEEL
Filed June 24, 1929   2 Sheets-Sheet 1

Inventor
Charles G. Fawkes

By Clarence A. O'Brien
Attorney

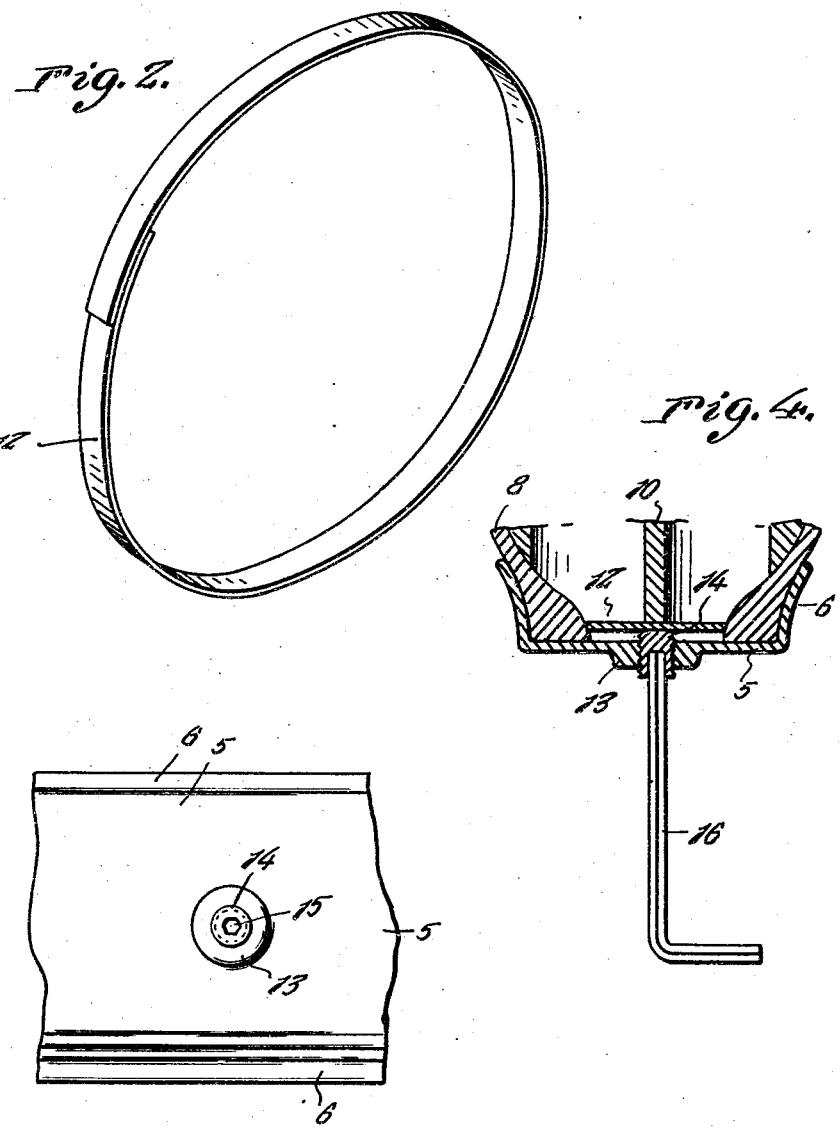

Patented May 19, 1931

1,805,574

UNITED STATES PATENT OFFICE

CHARLES G. FAWKES, OF DENVER, COLORADO

VEHICLE WHEEL

Application filed June 24, 1929. Serial No. 373,265.

The present invention relates to new and useful improvements in resilient wheels and more particularly to a novel cushion wheel especially adapted for use on motor vehicles.

The principal object of this invention is to provide a cushion wheel as a substitute for the pneumatic wheels now generally employed on motor vehicles.

Another important object of the invention is to provide a cushion wheel with means whereby the resiliency thereof may be regulated as desired.

These and numerous other important objects of the invention will become more apparent after considering the invention as described and claimed hereinafter.

In the drawings:

Figure 2 represents a perspective view of the split band.

Figure 4 represents a fragmentary cross sectional view of the wheel showing the means for adjusting the split band.

Figure 5 represents a fragmentary elevation of the wheel rim.

Figure 1:
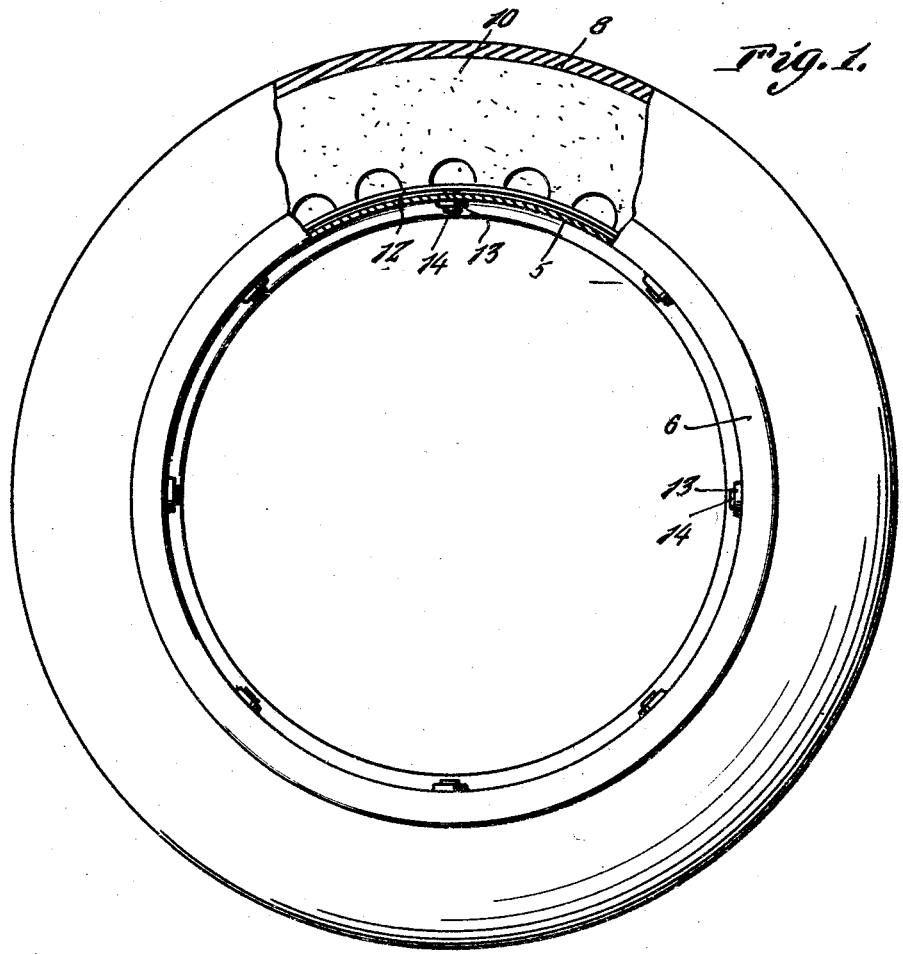
Figure 1 represents a side elevation of the improved wheel, showing a portion thereof broken away to disclose the construction of the core.

Referring to the drawings, wherein like numerals designate like parts, it will be seen that the present invention includes a rim 5 provided with the spaced circumferentially extending flanges 6—6. The rim is adapted to engage on a felly 7 of suitable construction and any desired type of securing means may be employed for retaining the rim on the felly. The tire casing 8 is substantially of the same construction as the pneumatic tire casing now in general use, the same being provided with the heavy longitudinal edge portion 9 for engagement within the rim 5.

The core 10 is of annular construction and of circular shape in cross section. Pockets or air cells 11 extend radially from the inner side of the core. There are preferably two rows of such pockets separated by a longitudinally extending central wall and the cells of each row are positioned apart at equal intervals. The core is of increased cross sectional thickness adjacent the outer sides of the cells to provide substantial supporting side walls of greater cross sectional thickness than the central partitioning wall, said side walls having inner and outer relatively straight and arcuately curved surfaces.

For compressing the core into the proper resiliency, a split band 12 is provided for disposition within the casing 8 and between the core 10 and the rim 5. The inner side of the rim 5 is provided with bosses 13, each of which is provided with a threaded bore for receiving a threaded plug 14. Each plug is provided with a polygonal shaped socket 15 for receiving a polygonal shaped insertible wrench 16. (See Fig. 4.)

Figure 3:
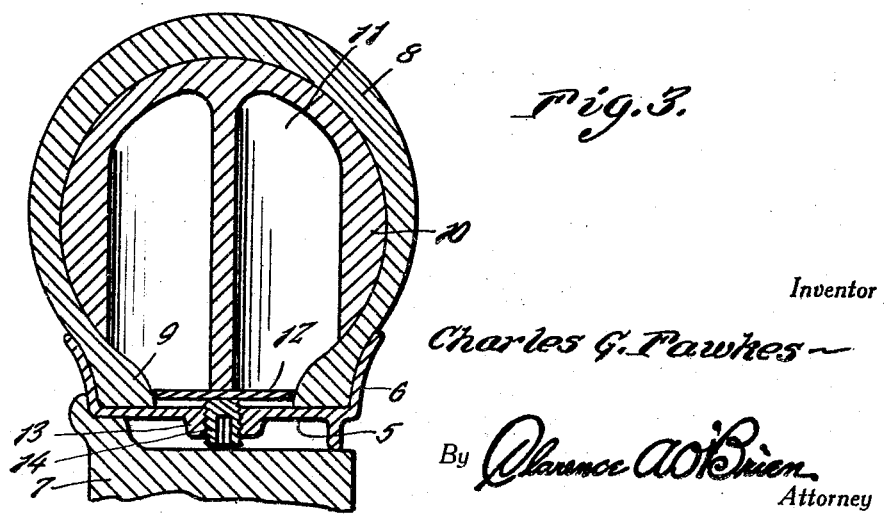
Figure 3 represents a cross sectional view of the improved wheel.

It will thus be seen that by seating the plugs 14 inwardly by actuating the inserted wrench 16, the band 12 will be expanded and resultingly compress the core 10 to the required compactness to permit the proper degree of resiliency. The core 10 is preferably of some highly resilient substance that may be readily compressed by the band 12 and which will retain its resiliency, so that when the band 12 is permitted to contract, the same will follow. As shown in Figure 3, the extensible band 12 is positioned between the beads of the casing 8 so that it maintains the beads in laterally spaced relation against the flanges of the rim, but also acts as a pressure transmitting means by which the partition defined between the laterally spaced pockets 11 may be thrust outward.

It is thought that the present wheel structure will overcome the enormous expense and upkeep of too many wheels especially on pleasure cars. The present invention will also overcome numerous other disadvantages found in pneumatic wheels, especially in view of their susceptibility to punctures and blowouts.

While the foregoing description has been in definite terms, it is to be understood that numerous changes in the specific shape, size and materials may be resorted to without departing from the spirit and scope of the invention as claimed hereinafter.

Having thus described my invention, what I claim as new is:

In a wheel structure, a rim having flanges, a casing having laterally spaced beads engaged with the flanges, a core of resilient material within the casing being provided with laterally spaced radial pockets defining an intervening central partition wall and outer side walls of greater cross sectional thickness than the said central partition wall and having inner and outer relatively straight and arcuately curved surfaces, an expansible band positioned between the beads of the casing to space the same and being engaged with said partition, and a pressure member carried by said rim and engaged with said band.

In testimony whereof I affix my signature.

CHARLES G. FAWKES.